US008284331B2

(12) United States Patent
Chien

(10) Patent No.: US 8,284,331 B2
(45) Date of Patent: Oct. 9, 2012

(54) DUAL-PURPOSE PROJECTIVE DISPLAY

(76) Inventor: Shih-Chin Chien, Banciao (TW)

( * ) Notice: Subject to any disclaimer, the term of this patent is extended or adjusted under 35 U.S.C. 154(b) by 736 days.

(21) Appl. No.: 11/984,171

(22) Filed: Nov. 14, 2007

(65) Prior Publication Data

US 2009/0059102 A1  Mar. 5, 2009

(30) Foreign Application Priority Data

Aug. 27, 2007 (TW) ................. 96214213 U

(51) Int. Cl.
*G02F 1/1333* (2006.01)
*G02F 1/1335* (2006.01)
*G02F 1/00* (2006.01)
*G03B 21/14* (2006.01)

(52) U.S. Cl. .......... 349/5; 349/58; 349/61; 349/68; 348/751; 353/119

(58) Field of Classification Search ........... 349/5, 58, 349/61, 68; 348/751; 353/119
See application file for complete search history.

(56) References Cited

U.S. PATENT DOCUMENTS

| | | | |
|---|---|---|---|
| 6,104,447 A * | 8/2000 | Faris | 349/5 |
| 7,110,052 B1 * | 9/2006 | Faris et al. | 349/5 |
| 2005/0280785 A1 * | 12/2005 | Beeson et al. | 353/97 |

* cited by examiner

*Primary Examiner* — Jessica M Merlin

(74) *Attorney, Agent, or Firm* — Muncy, Geissler, Olds & Lowe, PLLC

(57) ABSTRACT

A projective display is signally connected with an electronic device capable of exporting an image, so as to allow a user to optionally view the image exported by the electronic device, wherein the projective display comprises:

a transparent liquid crystal display assembly, which is signally connected with the electronic device;

a light-emitting device, which emits a light to the liquid crystal display assembly; and a backlight module, which is aligned to a rear side of the liquid crystal display assembly for providing a surface light source to the liquid crystal display assembly so that the liquid crystal display assembly can function as an ordinary display, wherein, when the light-emitting device emits the light to the liquid crystal display assembly, and the backlight module is displaced from or not aligned to the rear side of the liquid crystal display assembly, the light emitted by the light-emitting device can pierce through the liquid crystal display assembly and make an image presented on the liquid crystal display assembly further magnified and projected onto a specific projection surface. Thereupon, the liquid crystal display assembly is endowed with a dual purpose.

4 Claims, 9 Drawing Sheets

DUAL-PURPOSE PROJECTIVE DISPLAY

BACKGROUND OF THE INVENTION

1. Technical Field

The present invention relates to projective displays and, more particularly, to a projective display implementing an operational principle where a conventional projector operates upon to project an image presented at a liquid crystal display to a projection surface.

2. Description of Related Art

The promptly developed display technology revolutionizes projective systems and other displaying devices. The operational mechanisms where conventional projectors operate upon can be generally divided into three types, which are cathode ray tube (CRT), transparent liquid crystal display (LCD) and digital light processor (DLP). Especially, transparent LCD is popular among business people for the advantageous lightweight and portability thereof.

Projective methods applied to projectors using transparent LCD can be further divided into two types. The first one is to make a light source pierce through a single LCD, and then be filtered by a color filter so as to derive a true-color image for being projected onto a specific projection surface. The other method is to resolve a light into red, green, and blue color-channels, namely RGB colors, and make the color channels pierce through a respective LCD. Afterward, the three color-channels are again integrated into a colored image for being magnified and projected onto a specific projection surface.

Since projectors employing the aforementioned two projective methods are far superior to those employing CRT as the operational mechanism in both image quality and compact volume, they are extensively adopted in offices, classrooms and families.

FIG. 1 depicts a projector 10, which uses transparent LCD as previously described. While it is advantageous by the portable volume and weight, it still requires to be signally connected with an electronic device, e.g. a personal computer, for receiving image signals from the electronic device, so as to project an image provided by the electronic device onto a specific projection surface, just like projectors employing CRT as the operational mechanism. However, for purpose of the aforementioned signal connection, time can be significantly consumed and hardware conflicts may occur between devices from different manufacturers. Besides, to users who frequently use such conventional projectors to facilitate their briefing or presentation, it is undoubtedly a burden to bring laptops and projectors simultaneously. Some prior arts have attempted to remedy these problems by integrating a personal computer with the projector 10, such as Taiwan Patent Publication M268621, entitled as "Projective Notebook". Nevertheless, such solution somehow sacrifices convenient usage that a personal computer originally performs.

Hence, a need exists for perfectly integrating a projection function with displays of various existing electronic devices so that a user can optionally make an image magnified and projected onto a specific projection surface as needed, or the user can directly view the image provided by the electronic device through the display.

SUMMARY OF THE INVENTION

The present invention has been accomplished under these circumstances in view. It is one objective of the present invention to provide a projective display, which comprises a light-emitting device that projects a high-intensity light toward a liquid crystal display assembly. Thereby, an image presented at the liquid crystal display assembly can be magnified and projected onto a specific projection surface such that a desired effect of projecting and magnifying images can be accomplished.

To achieve these and other objectives, the present invention provides a projective display, which can be signally connected with an electronic device capable of exporting an image, so as to allow a user to optionally view the image exported by the electronic device, wherein the projective display comprises:

a transparent liquid crystal display assembly, which is signally connected with the electronic device;

a light-emitting device, which emits a dot light to the liquid crystal display assembly; and a backlight module, which is aligned to a rear side of the liquid crystal display assembly for providing a surface light source to the liquid crystal display assembly so that the liquid crystal display assembly can function as an ordinary display, wherein, when the light-emitting device emits the light to the liquid crystal display assembly, and the backlight module is displaced from or not aligned to the rear side of the liquid crystal display assembly, the light emitted by the light-emitting device can pierce through the liquid crystal display assembly and make an image presented at the liquid crystal display assembly further magnified and projected onto a specific projection surface.

Thereupon, the liquid crystal display assembly is endowed with multiple functions to present the image as the ordinary display or alternatively have the image presented thereon magnified and projected According to the concept of the present invention as previously described, an outer frame is further provided around the liquid crystal display assembly. The backlight module is pivotally connected with one side of the outer frame such that the backlight module can be pivoted with respect to the liquid crystal display assembly and at least two included angles, namely a first included angle and a second included angle, are alternatively formed therebetween. When the liquid crystal display assembly and the backlight module include the first included angle (the first included angle is typically 0°), the liquid crystal display assembly and the backlight module are mutually parallel and aligned. At this time, the liquid crystal display assembly functions as an ordinary display in virtue of the surface light source provided by the backlight module. Alternatively, when the liquid crystal display assembly and the backlight module include the second included angle (the second included angle is typically greater than 90°), the light-emitting device can emit the light toward the liquid crystal display assembly, so that the light can pierce trough the liquid crystal display assembly and be projected onto the specific projection surface.

According the concept of the present invention as mentioned above, the light-emitting device comprises:

a plurality of light-emitting diodes;

a driving circuit for lighting the light-emitting diodes; and a lens assembly, for integrating lights form the light-emitting diodes into a high-intensity dot light source.

According the concept of the present invention as mentioned above, the specific projection surface refers to any wall, white board or cloth screen, which can present the projected image. Further, the specific projection surface is preferably white.

According the concept of the present invention as mentioned above, the signal connection between the electronic device and the liquid crystal display assembly may be realized by using a signal cable for transmitting signals or directly integrating the electronic device and the liquid crystal display assembly as an integral.

According the concept of the present invention as mentioned above, the electronic device can be any device that requires a screen to present an image, such as a personal computer, an image player etc. While the electronic device is integrated with the liquid crystal display assembly as an integral, the electronic device may be an image decoding circuit.

To achieve the foregoing objectives of the present invention, the present invention provides a projective display, which can be signally connected with an electronic device requiring presenting an image, so as to allow a user to view the image presented by the electronic device, wherein the projective display comprises:

a body, being divided into a front end, a middle segment and a rear end opposite to the front end;

a transparent liquid crystal display assembly, which is signally connected with the electronic device, and is pivotally connected with the middle segment, wherein at least two included angles, namely a first included angle and a second included angle, are alternatively formed between the liquid crystal display assembly and the body;

a light-emitting device, which is deposited at the front end of the body and emits a light to the liquid crystal display assembly; and a backlight module, which is deposited at the middle segment of the body for providing a surface light source to the liquid crystal display assembly so that when the liquid crystal display assembly and the body include the first included angle, the backlight module is aligned to a rear side of the liquid crystal display assembly, and the liquid crystal display assembly can function as an ordinary display; when the liquid crystal display assembly and the body include the second included angle, the light from the light-emitting device can pierce through the liquid crystal display assembly and make an image presented on the liquid crystal display assembly further magnified and projected onto a specific projection surface.

Thereupon, the effects of magnifying and projecting the image presented on the liquid crystal display assembly can be achieved.

According to the concept of the present invention as previously described, a fixing seat may be provided at the front end of the body for fixing the specific projection surface in a manner that the projection surface and the liquid crystal display assembly are parallel mutually.

Moreover, the fixing seat is connected with the front end of the body by means of an extension brace so that by adjusting the extension brace, a distance between the fixing seat and the liquid crystal display assembly can be changed and a size of the image projected on the projection surface can be corresponding changed.

According the concept of the present invention as mentioned above, in addition to the fixing seat, the front end of the body may further comprise a folding projection surface for receiving an image projected thereon.

According the concept of the present invention as mentioned above, the light-emitting device can be also connected to the liquid crystal display assembly via an extension brace, like the fixing seat, so that a distant between the light-emitting device and the liquid crystal display assembly can be adjusted. Principally, the larger the distance is, the smaller the projected image is.

According the concept of the present invention as mentioned above, the light-emitting device comprises:

a plurality of light-emitting diodes; and a driving circuit for lighting the light-emitting diodes.

The light-emitting device may further comprise a lens assembly, for integrating lights form the light-emitting diodes into a high-intensity dot light source.

According the concept of the present invention as mentioned above, the specific projection surface refers to any wall, white board or cloth screen, which can present the projected image. Further, the specific projection surface is preferably white.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

For purpose of illustration, some embodiments are provided in company with the drawings to explain the technical means and effects of the present invention.

It is to state firstly that an electronic device described in the present invention is a device that can present a signal or an image through a display, such as, but not limited to, a computer, a game player, an image player, etc. Similarly, a specific projection surface described in the present invention is not limited to a cloth projection screen, yet may be a general wall or a white board typically used in teaching. Preferably, the projection surface is white.

Figure 1:
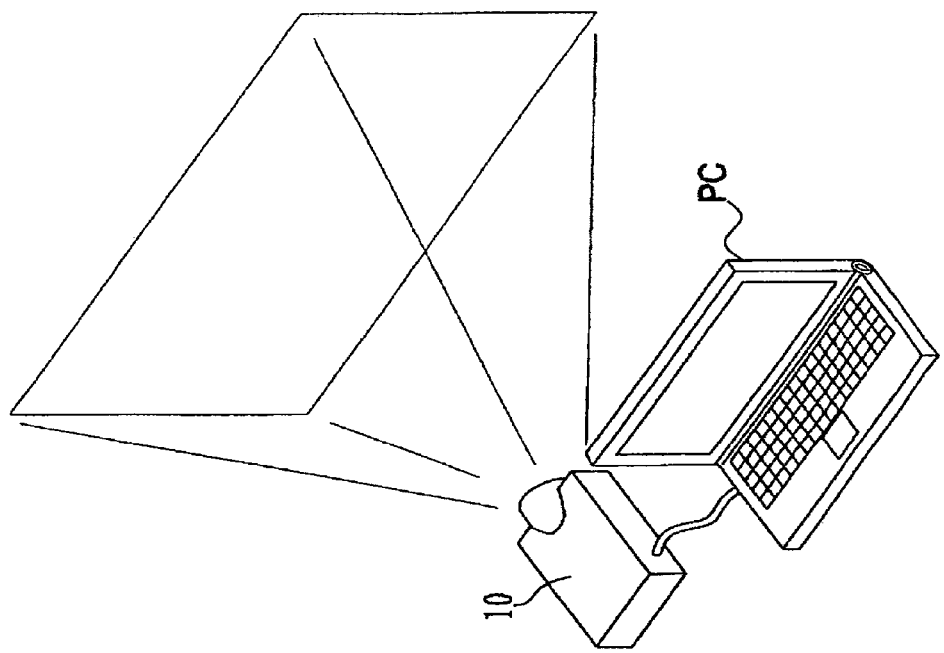
FIG. 1 is a schematic drawing showing a conventional projector in use.
Figure 2:
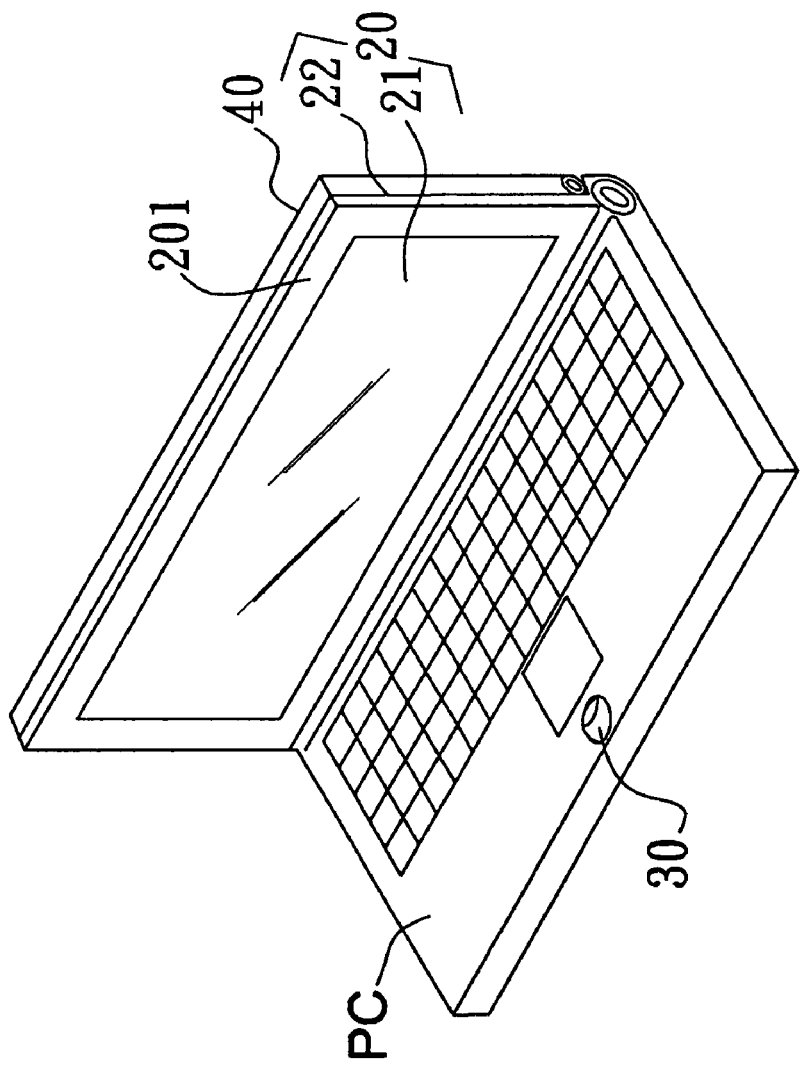
FIG. 2 is a perspective view showing the disclosed subject matter used as a display of a general laptop.
Figure 3:
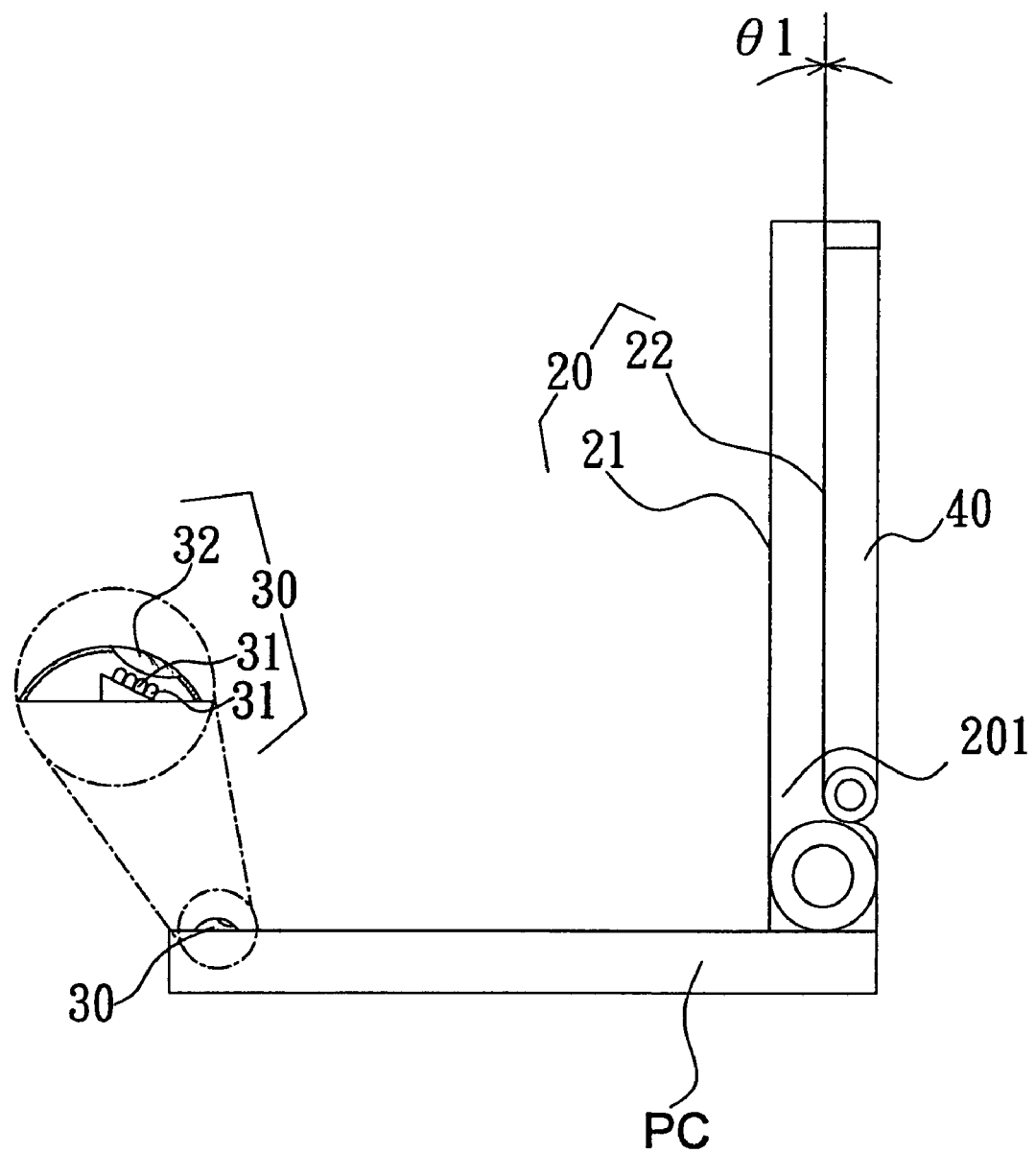
FIG. 3 is a lateral view made according to FIG. 2.
Figure 4:
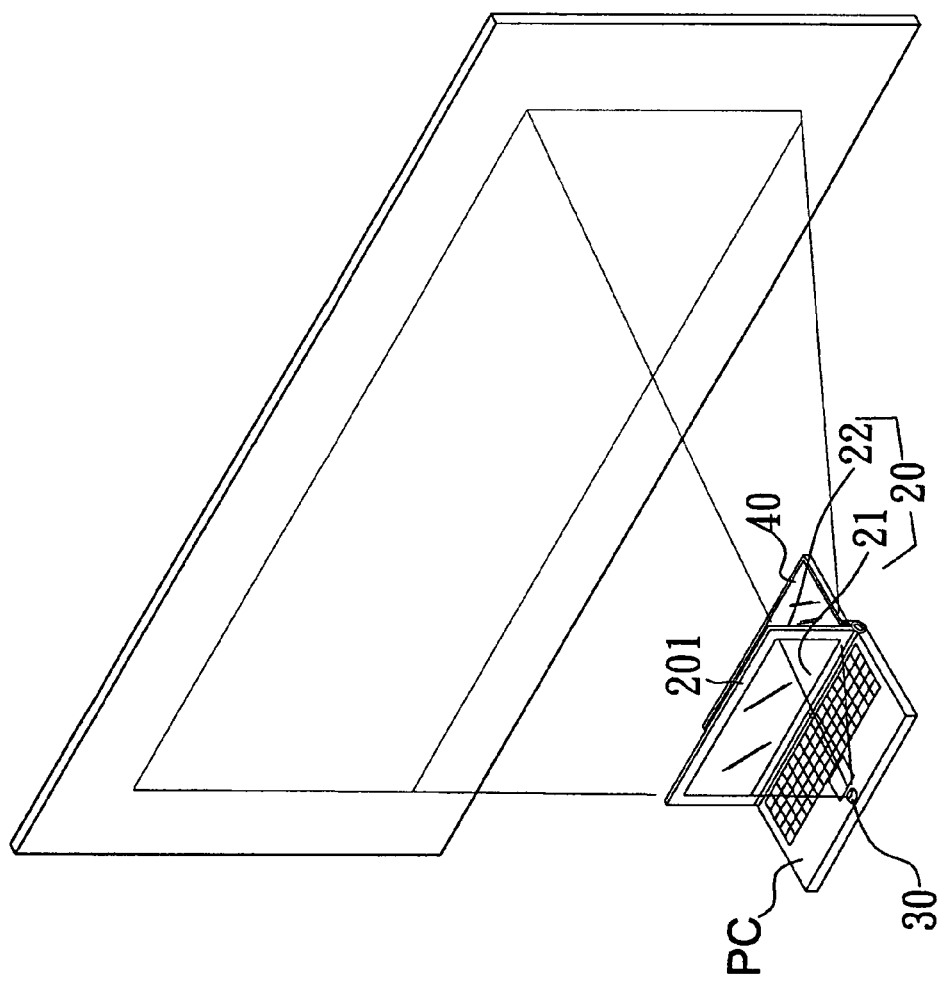
FIG. 4 is a perspective view showing the disclosed subject matter used as a projector.
Figure 5:
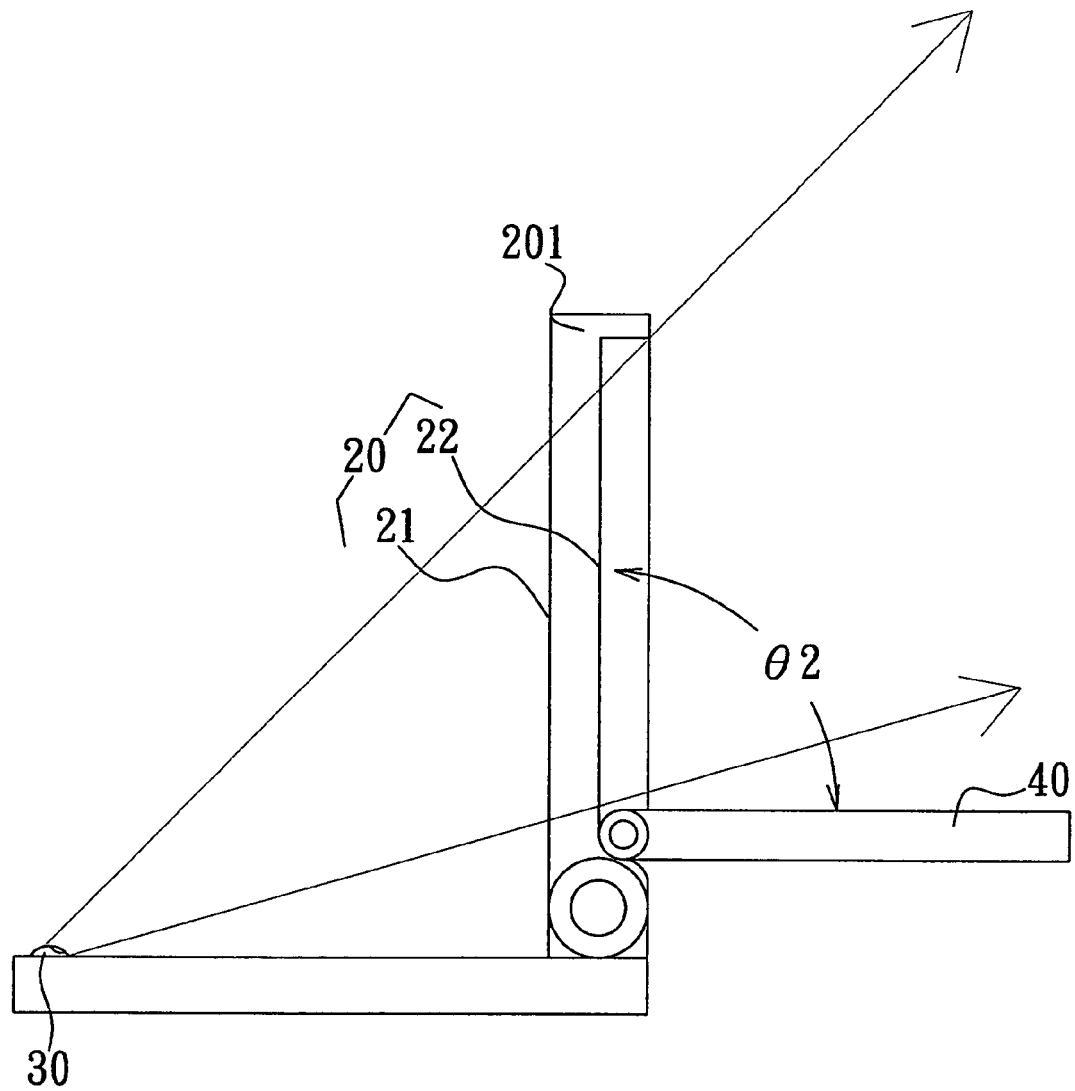
FIG. 5 is a lateral view made according to FIG. 4.

Please refer to FIGS. 2 through 5, wherein FIG. 2 is a perspective view showing the disclosed subject matter used as a display of a general laptop. FIG. 3 is a lateral view made according to FIG. 2. FIG. 4 is a perspective view showing the disclosed subject matter used as a projector. FIG. 5 is a lateral view made according to FIG. 4.

In the drawings, a first embodiment of the present invention is shown. The projective display allows a user to view an image thereon as using an ordinary, or to project the image onto a specific projection surface while making the image magnified for viewing. The display comprises a transparent liquid crystal display assembly 20, a light-emitting device 30 and a backlight module 40.

Therein, the liquid crystal display assembly 20 is pervious to light and has a signal connection with a personal computer, as shown in FIG. 2. The signal connection can be realized by coupling a female and male terminal, or simply using a signal cable. The liquid crystal display assembly 20 comprises a liquid crystal panel capable of present images and at least one filter (not shown). In the present embodiment, the liquid crystal display assembly 20 may be a transparent thin film transistor-liquid crystal display or a transflective thin film transistor-liquid crystal display. Despite to the actual structure of the liquid crystal display assembly 20, the liquid crystal display assembly 20 can be divided into a front side 21 for being viewed and a rear side 22 adjacent to the backlight module 40.

The light-emitting device 30 is positioned corresponding to the front side 21 of the liquid crystal display assembly 20 for emitting a high-intensity light to the liquid crystal display assembly 20. According to the present embodiment, the light-emitting device 30 comprises: a plurality of light-emitting diodes (LED) 31; a driving circuit (not shown) for lighting the light-emitting diodes, and a lens assembly 32, for integrating lights form the light-emitting diodes into a dot light source. Therein, the light-emitting device 31 are preferably high CRI (Color Rending Index) white LED, so as to avoid excessive color-shift of projected images. The lens assembly 32 is positioned between the light-emitting diodes 31 and the liquid crystal display assembly 20 (as shown in FIG. 3) so as to collect and integrate lights emitted from the light-emitting diodes 31 into a dot light source.

When the backlight module 40 is aligned to the rear side 22 of the liquid crystal display assembly 20, the backlight module 40 provides the surface light source to the liquid crystal display assembly 20 so that an image presented on the liquid crystal display assembly 20 becomes luminiferous and a user can view the image at the front side 21 of the liquid crystal display assembly 20. That is, the liquid crystal display assembly 20 currently functions as an ordinary display. In an alternative application, the light-emitting device 30 can emit the high-intensity light to the liquid crystal display assembly 20 while the backlight module 40 is displaced from the rear side 22 of the liquid crystal display assembly 20 or not aligned to the liquid crystal display assembly 20, so that the light from the light-emitting device 30 can pierce through the liquid crystal display assembly 20 and reach the specific projection surface. More particularly, the movable connection between the backlight module 40 and the liquid crystal display assembly 20 may be realized by, but not limited to, a pivotal connection or a scarf connection. Thereby, when the backlight module 40 is movably connected with the frame 201 provided around the liquid crystal display assembly 20, at least two included angles are alternatively formed therebetween. The two included angles are defined as a first included angle θ1 and a second included angle θ2, respectively. When the liquid crystal display assembly 20 and the backlight module 40 include the first included angle θ1 (the first included angle θ1 is typically 0°), the backlight module 40 and the liquid crystal display assembly 20 are mutually parallel and aligned, as shown in FIG. 3. At this time, the liquid crystal display assembly 20 functions as an ordinary display and allow a user to view the image presented thereon at the front side 21 of the liquid crystal display assembly 20. When a need exists for providing the image to a plurality of viewer or magnifying the image, the backlight module 40 can be properly moved with respect to the liquid crystal display assembly 20 such that the both include the second included angle θ2 (the second included angle θ2 is typically greater than 90°), and the light-emitting device 30 emits the light to project the image presented at the front side 21 of the liquid crystal display assembly 20 on to the projection surface. Thereupon, a desired effect of projecting and magnifying images can be accomplished.

Figure 6:
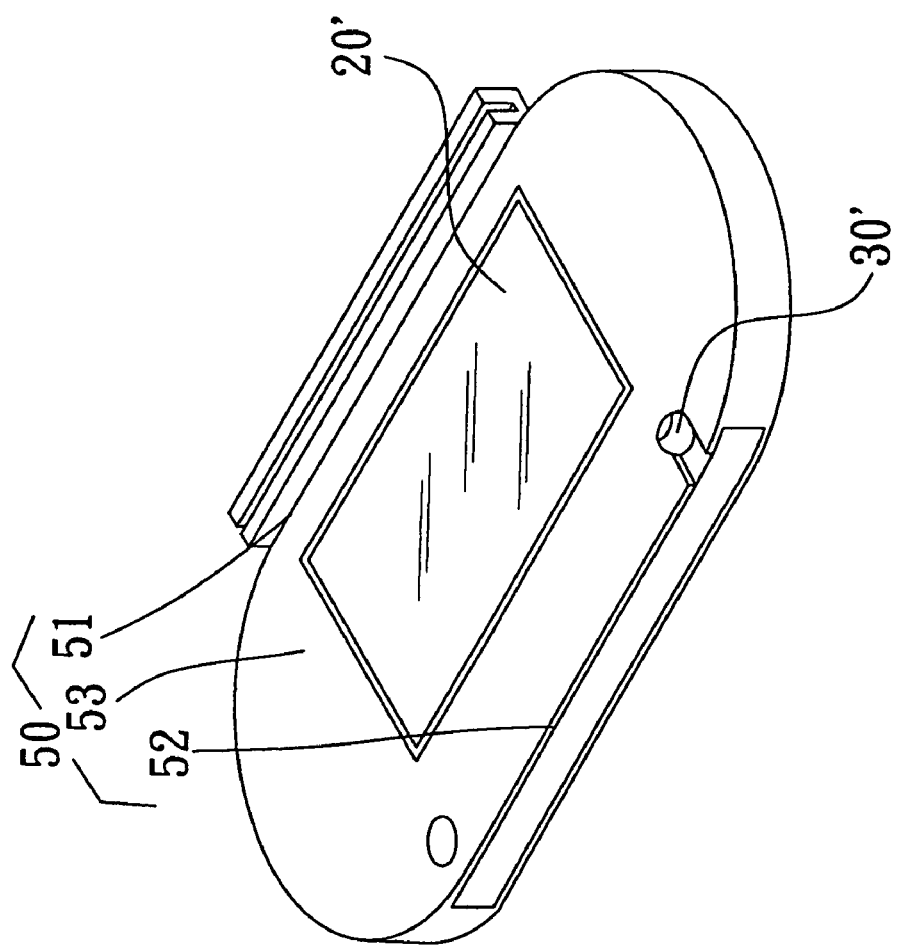
FIG. 6 is a perspective view of another embodiment of the present invention.
Figure 7:
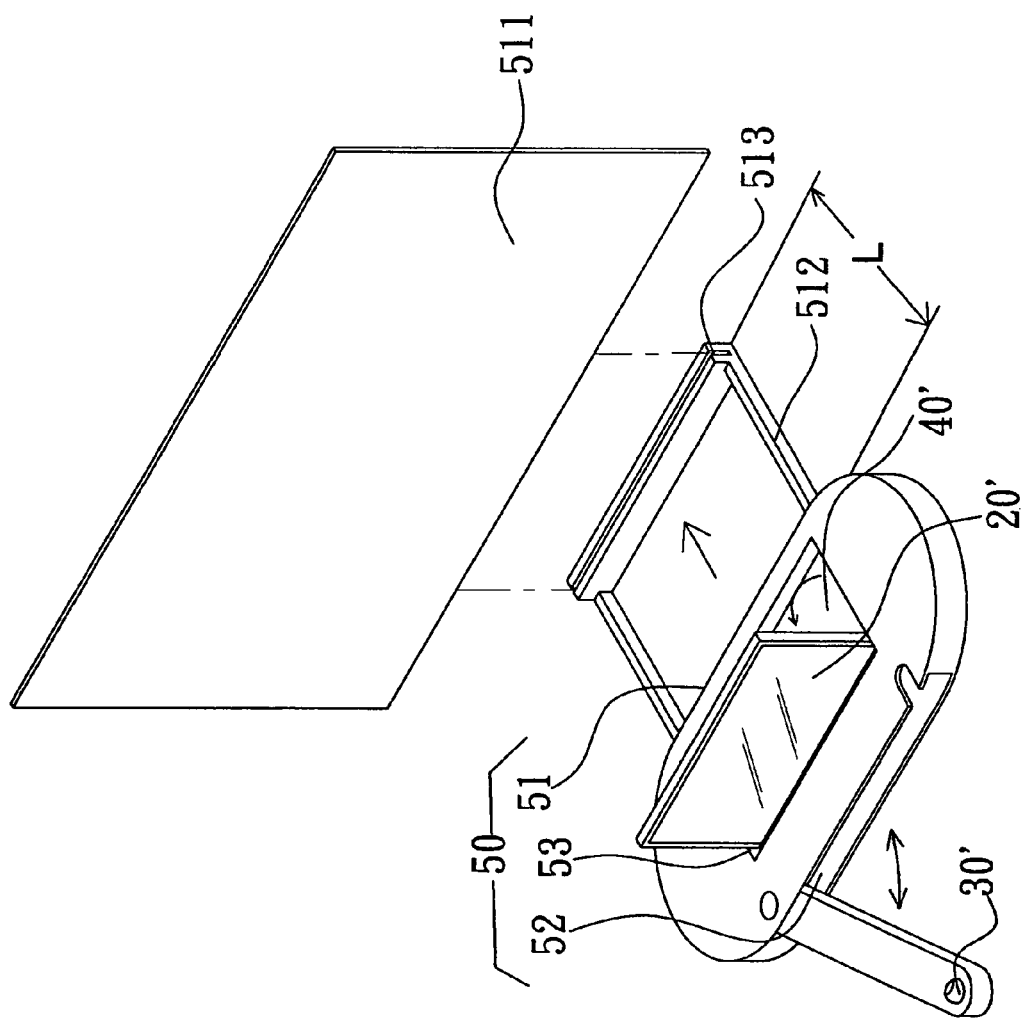
FIG. 7 is another perspective view of the embodiment shown in FIG. 6.
Figure 8:
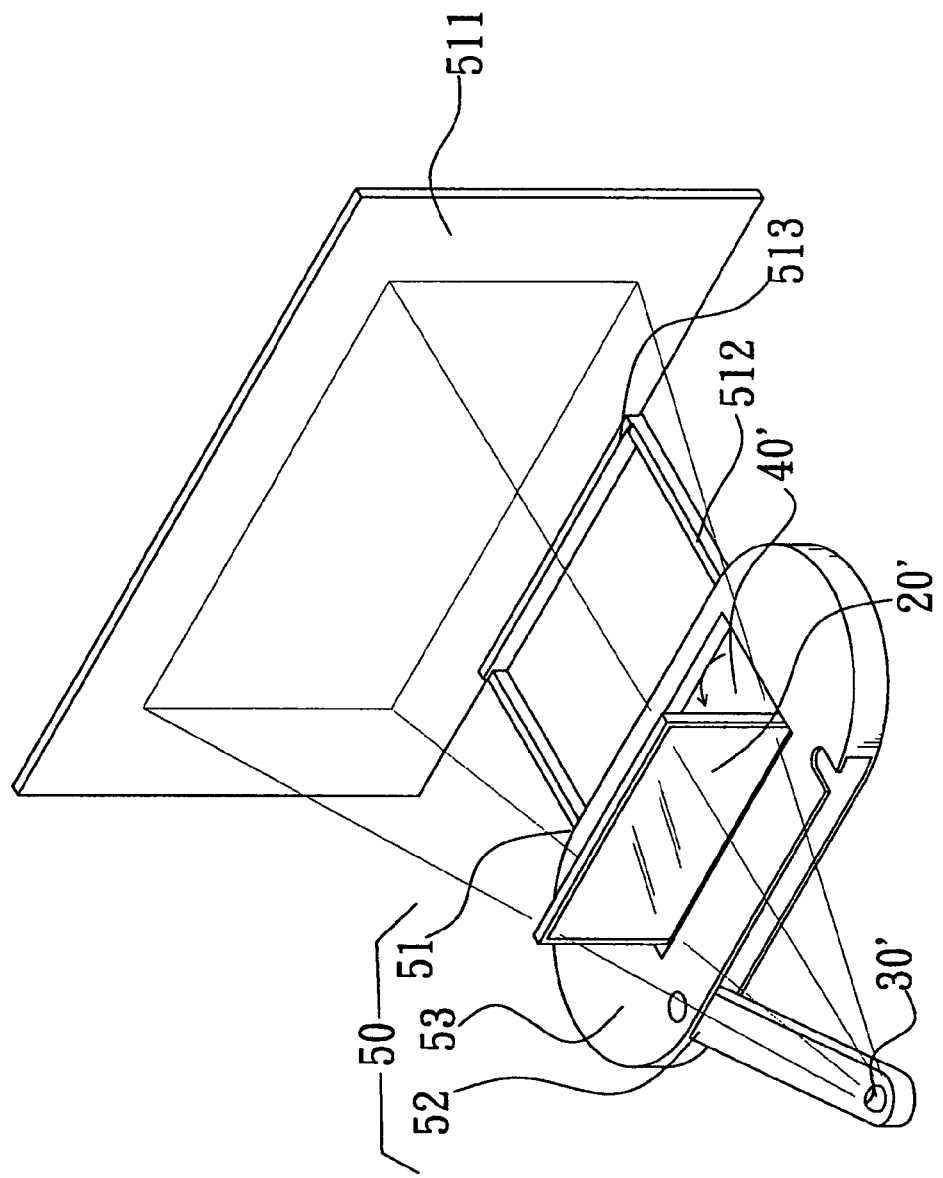
FIG. 8 is an applied view of the embodiment shown in FIG. 7.
Figure 9:
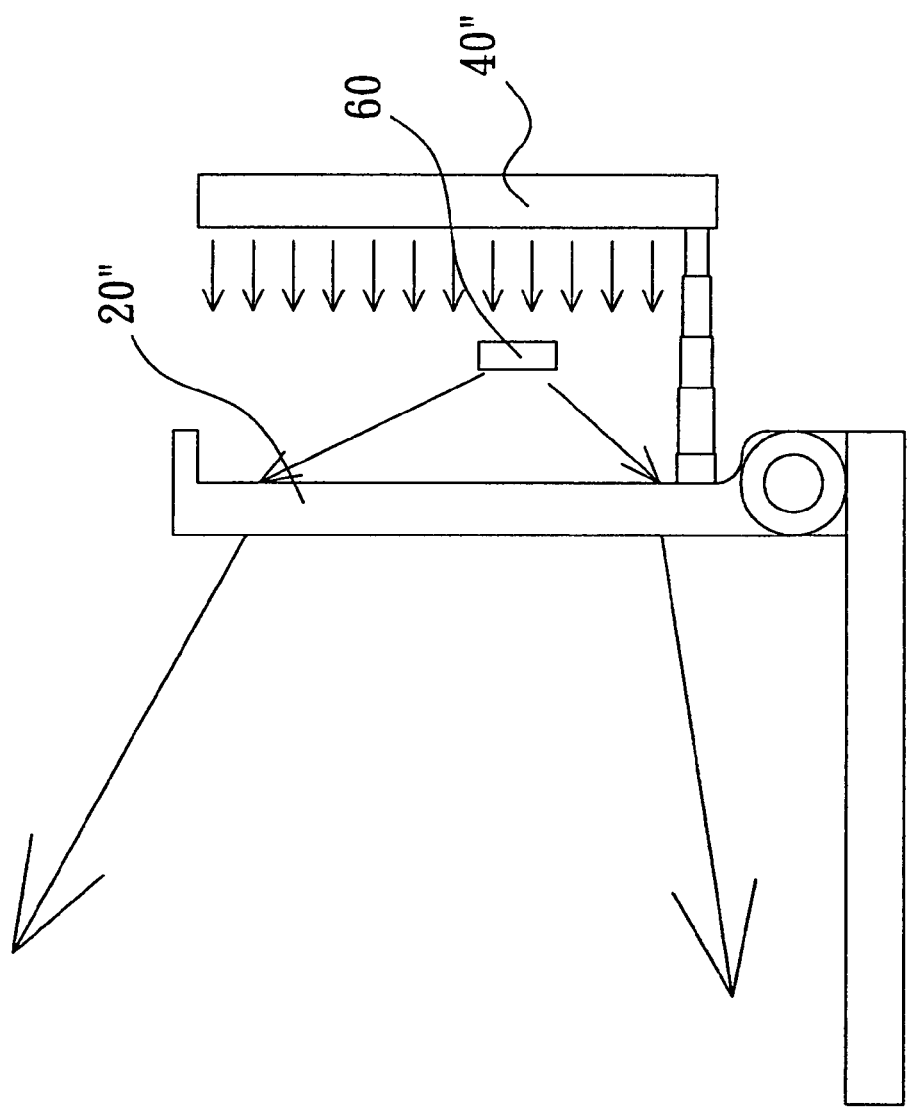
FIG. 9 is a structural view of yet another embodiment of the present invention.

Please refer to FIGS. 6 through 8, wherein FIG. 6 is a perspective view of another embodiment of the present invention. FIG. 7 is another perspective view of the embodiment shown in FIG. 6. FIG. 8 is an applied view of the embodiment shown in FIG. 7.

In the drawings, a second embodiment of the present invention is shown. The projective displaying device can be signally connected with a general electronic device, such as an image player or a computer game player so as to allow a user to view an image provided by the electronic device at the displaying device or to magnify and project the image onto a specific projection surface. The projective displaying device comprises a transparent liquid crystal display assembly 20', a light-emitting device 30', a backlight module 40' and a body 50, as shown in FIGS. 6 and 7. Therein, the liquid crystal display assembly 20', the light-emitting device 30' and the backlight module 40' are similar to those described in the first embodiment in substance, and need not be discussed at length herein. The present embodiment is different from the first embodiment by functioning as a second display of a general electronic device so that the user can view an image presented on the electronic device through a relative larger display inherent therein or through projecting and magnifying the image onto a specific projection surface.

Therein, the body 50 can be divided into a front end 51, a rear end 52 opposite to the front end 51 and a middle segment 53 intercalary therebetween. The liquid crystal display assembly 20' is deposited at the middle segment 53 of the body 50. The light-emitting device 30' is deposited at the front end 51 of the body 50 and aligned to the liquid crystal display assembly 20'. The backlight module 40' is deposited at the middle segment 53 in company with the liquid crystal display assembly 20'. In the present embodiment, at least two included angles are alternatively formed between the backlight module 40' and the liquid crystal display assembly 20'. The two included angles are defined as a first included angle θ1 and a second included angle θ2, respectively. Similar to the first embodiment, when the backlight module 40' is aligned with the liquid crystal display assembly 20', the both include the first included angle θ1 (the first included angle θ1 is typically 0°). At this time, the liquid crystal display assembly 20' functions as an ordinary display screen, as shown in FIG. 6. When the image provided by the electronic is to be projected and magnified onto the projection surface, the backlight module 40' can be properly moved with respect to the liquid crystal display assembly 20' such that the both include the second included angle θ2 (the second included angle θ2 is typically greater than 90°), and the light-emitting device 30' emits the light. A lens assembly 32' deposited in front of a plurality of light-emitting diodes of the light-emitting device 30' can integrate lights from the light-emitting diodes into a dot light source. Then the dot light source can pierce through the liquid crystal display assembly 20' (as shown in FIG. 7) to project the image presented on the liquid crystal display assembly 20' on to the specific projection surface so as to achieve the effect of magnifying the image (as shown in FIG. 8).

Referring to FIGS. 6 and 7 again, in the present embodiment, a fixing seat 513 may be provided at the front end 51 of the body 50 for fixing the specific projection surface 511 in a manner that the projection surface 512 and the liquid crystal display assembly 20' are parallel mutually, as shown in FIG. 6. The fixing seat 513 is connected with the front end 51 of the body 50 by means of an extension brace 512 (as shown in FIGS. 6 and 7). Thereupon, by adjusting the extension brace 512, a distance L between the fixing seat 513 and the liquid crystal display assembly 20' can be changed and a size of the image projected on the projection surface 512 can be correspondingly changed. Principally, the larger the distance L is, the smaller the projected image is.

Although a particular embodiment of the invention has been described in detail for purposes of illustration, it will be understood by one of ordinary skill in the art that numerous variations will be possible to the disclosed embodiments without going outside the scope of the invention as disclosed in the claims.

What is claimed is:

1. A dual-purpose projective display, comprising:
    a transparent liquid crystal display assembly, which is divided into a front side and a rear side;
    a light-emitting device fixedly positioned on the front side of the liquid crystal display assembly, which emits a light to the front side of the liquid crystal display assembly; and
    a backlight module, which is movably connected at the rear side of the liquid crystal display assembly, for providing a surface light source the backlight module deposited at a middle segment in company with the liquid crystal display assembly, and at least two included angles alternatively formed between a front of the backlight module and the rear side of the liquid crystal display assembly, the two included angles defined as a first included angle and a second included angle respectively, when the backlight module is aligned with the liquid crystal display assembly, the first included angle $\theta 1$ is 0° with the front of the backlight module facing the rear side of the liquid crystal display, and the liquid crystal display assembly functions as an ordinary display screen;
    when the image provided by the liquid crystal display assembly is to be projected and magnified onto a projection surface, the backlight module is moved with respect to the liquid crystal display assembly such that the second included angle $\theta 2$ is greater than 90°, and the light-emitting device emits the light, a lens assembly deposited in front of a plurality of light-emitting diodes of the light-emitting device can integrate lights from the light-emitting diodes into a dot light source, then the dot light source can pierce through the liquid crystal display assembly to project the image presented on the liquid crystal display assembly on to the projection surface so as to achieve the effect of magnifying the image.

2. The dual-purpose projective display of claim 1, wherein an outer frame is further provided around the liquid crystal display assembly and the backlight module is pivotally connected with the outer frame.

3. The dual-purpose projective display of claim 1, wherein the light-emitting device comprises:
    a plurality of light-emitting diodes;
    a driving circuit for lighting the light-emitting diodes; and
    a lens assembly, for integrating lights form the light-emitting diodes into a dot light source.

4. The dual-purpose projective display of claim 1, wherein further comprising an electronic device that is an image decoding circuit and integrated with the liquid crystal display assembly.

* * * * *